Figure 1:
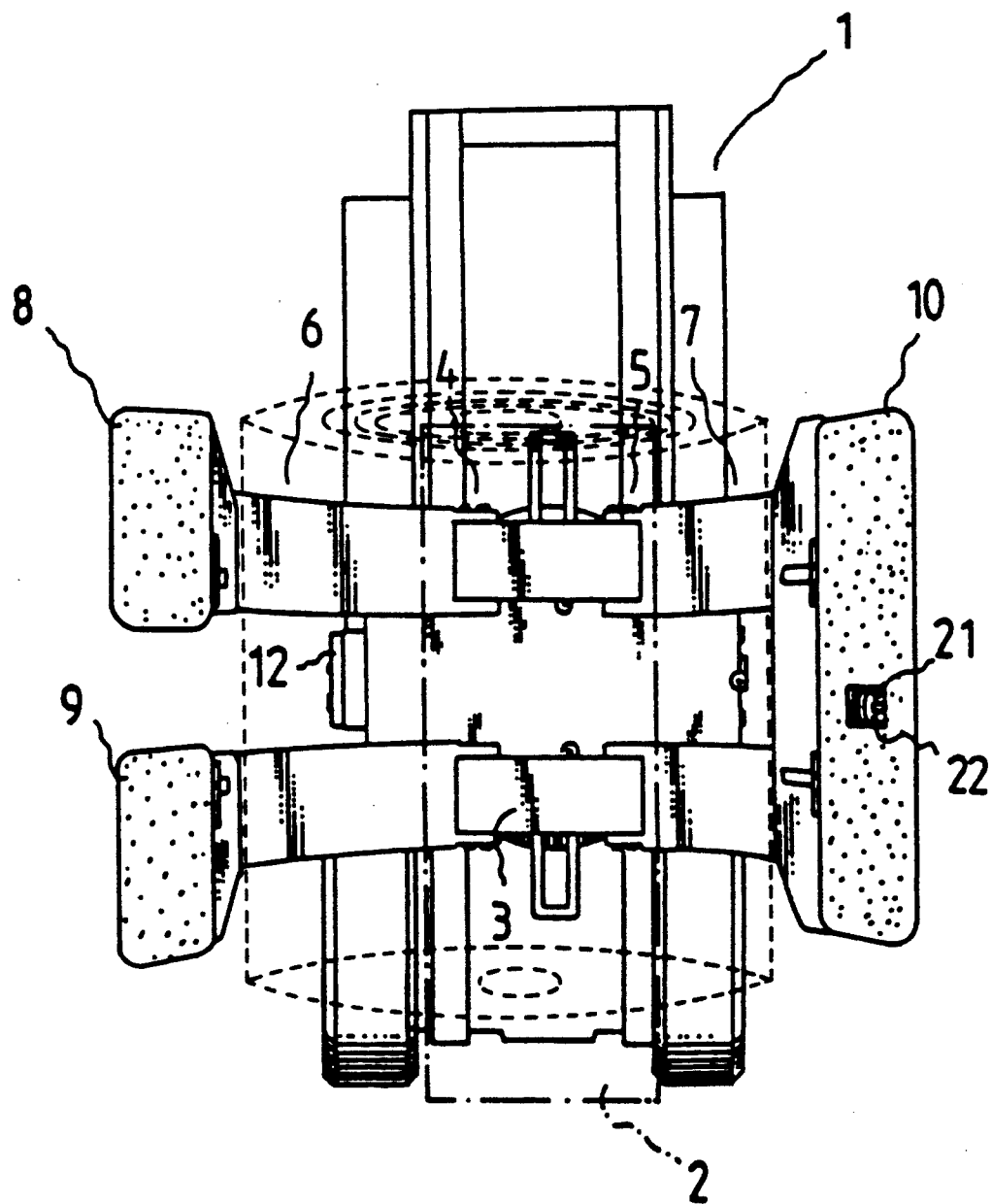

United States Patent [19]

Merin et al.

[11] Patent Number: 5,292,219
[45] Date of Patent: Mar. 8, 1994

[54] PROCEDURE AND APPARATUS FOR THE HANDLING OF LOADS

[75] Inventors: Peter Merin, Helsinki; Pertti Haapasalo, Espoo, both of Finland

[73] Assignee: Auramo Cargo Systems Oy, Vantaa, Finland

[21] Appl. No.: 879,851

[22] Filed: May 6, 1992

Related U.S. Application Data

[62] Division of Ser. No. 655,737, Feb. 14, 1991, abandoned.

[30] Foreign Application Priority Data

Feb. 23, 1990 [FI] Finland .................... 900938

[51] Int. Cl.⁵ .............................................. B66C 1/42
[52] U.S. Cl. .................................. 414/621; 414/730; 414/911; 294/88; 294/907
[58] Field of Search ............... 414/618, 619, 621, 730, 414/786, 910, 911, 607; 294/88, 907; 901/33

[56] References Cited

U.S. PATENT DOCUMENTS

| | | | |
|---|---|---|---|
| 3,904,234 | 9/1975 | Hill et al. | 901/32 X |
| 3,905,635 | 9/1975 | Esser | 414/621 X |
| 4,533,167 | 8/1985 | Johnson | 294/907 X |
| 4,605,354 | 8/1986 | Daly | 414/730 |
| 4,621,331 | 11/1986 | Iwata | 364/513 |
| 4,637,736 | 1/1987 | Andeen et al. | 901/33 X |
| 4,714,399 | 12/1987 | Olson | 414/618 X |
| 4,725,826 | 2/1988 | Hunter | 340/679 |
| 4,730,862 | 3/1988 | Caen et al. | 294/88 |
| 4,742,468 | 5/1988 | Ohashi et al. | 364/424 |
| 4,783,106 | 8/1988 | Nutter | |

FOREIGN PATENT DOCUMENTS

| | | | |
|---|---|---|---|
| 0112729 | 7/1984 | European Pat. Off. | |
| 2636473 | 8/1976 | Fed. Rep. of Germany | |
| 3245715 | 12/1982 | Fed. Rep. of Germany | |
| 3904365 | 9/1989 | Fed. Rep. of Germany | 901/33 |
| 4835559 | 5/1973 | Japan | |
| 4836849 | 5/1973 | Japan | |
| 5233254 | 3/1977 | Japan | 901/33 |
| 52-33253 | 5/1977 | Japan | 901/33 |
| 5313767 | 2/1978 | Japan | 414/730 |
| 53-44744 | 12/1978 | Japan | |
| 1337250 | 9/1977 | U.S.S.R. | 294/907 |
| 2166710 | 5/1986 | United Kingdom | |

Primary Examiner—David A. Bucci
Assistant Examiner—James Keenan
Attorney, Agent, or Firm—Lorusso & Loud

[57] ABSTRACT

Procedure and apparatus for the handling of loads using jaws pressed against the sides of the load. In the procedure of the invention, the slippage between the load and the jaws is measured and the compressive force of the jaws is adjusted on the basis of the slippage. The slippage is measured at least during a preliminary lifting performed before the load is lifted or at the beginning of the lifting operation. During the preliminary lifting the load can be lifted at an essentially lower speed than during the main lifting operation. The compressive force is increased during the preliminary lifting from a predetermined precompression value to at least a value at which the slipping ceases.

7 Claims, 3 Drawing Sheets

PROCEDURE AND APPARATUS FOR THE HANDLING OF LOADS

This is a divisional of copending applications Ser. No. 07/655,737 filed on Feb. 14, 1991, now abandoned.

The present invention relates to a procedure as defined in the introductory part of claim 1 and an apparatus as defined in the introductory part of claim 5 for the handling of loads.

At present, e.g. paper rolls may be handled using a gripper mounted on a forklift truck and having jaws which are hydraulically pressed against the load. The compressive force of the jaws can be adjusted manually e.g. to four different settings, depending on the load. Especially because of the rough adjustment of the compressive force, the load is often damaged due to excessive compression.

The object of the present invention is to eliminate the drawback referred to and to achieve a system for regulating the compressive force so as to optimize the compressive force needed. On the basis of the slippage between the load and the gripper jaws, the compressive force is adjusted in the manner stated in the characterizing clauses of claims 1 and 5, presented later.

In the following, the invention is described in detail by the aid of an example by referring to the attached drawings, in which FIG. 1 presents a gripper.

Figure 2:
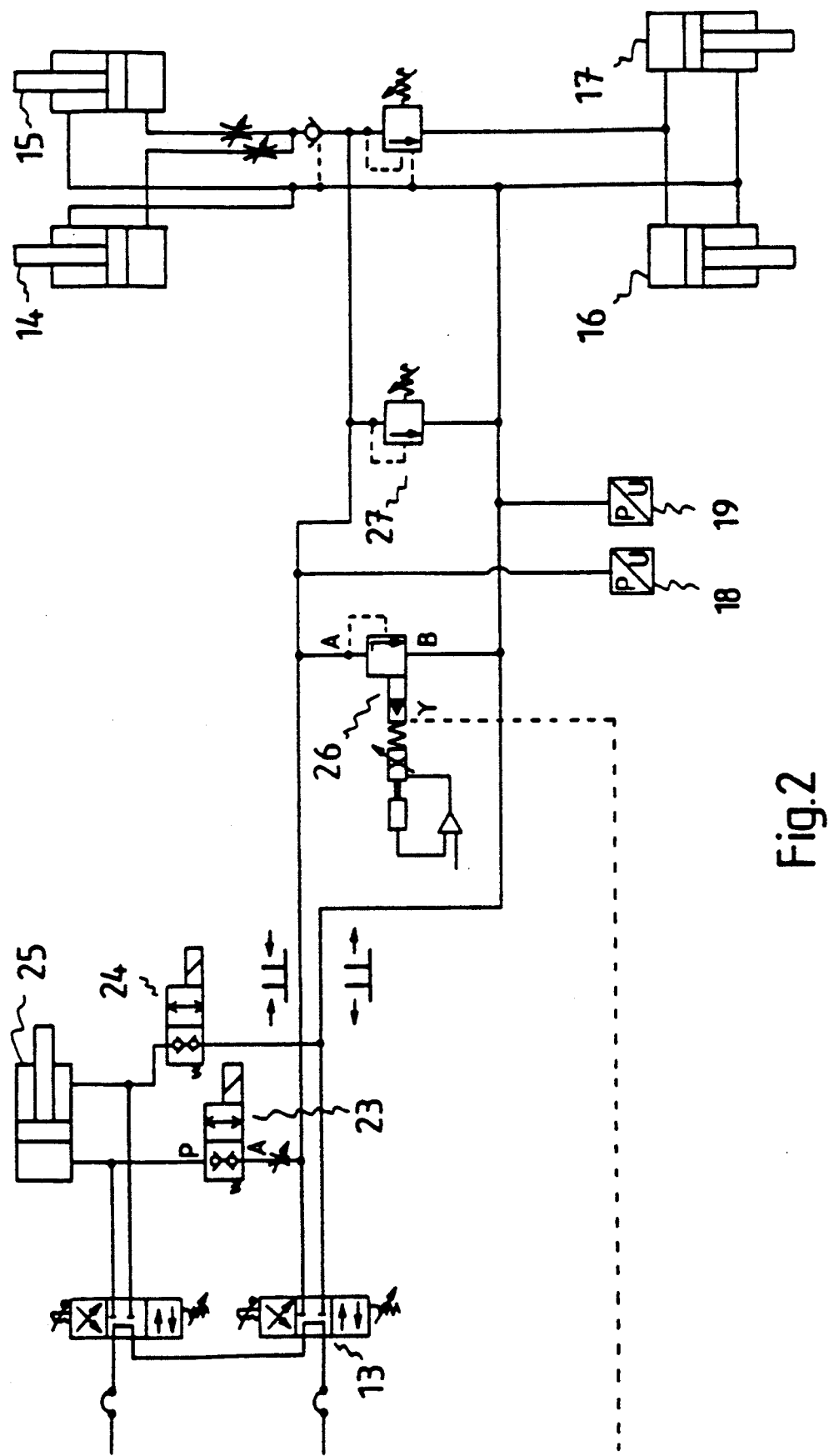

FIG. 2 presents a diagram of the hydraulic system of the invention.

Figure 3:
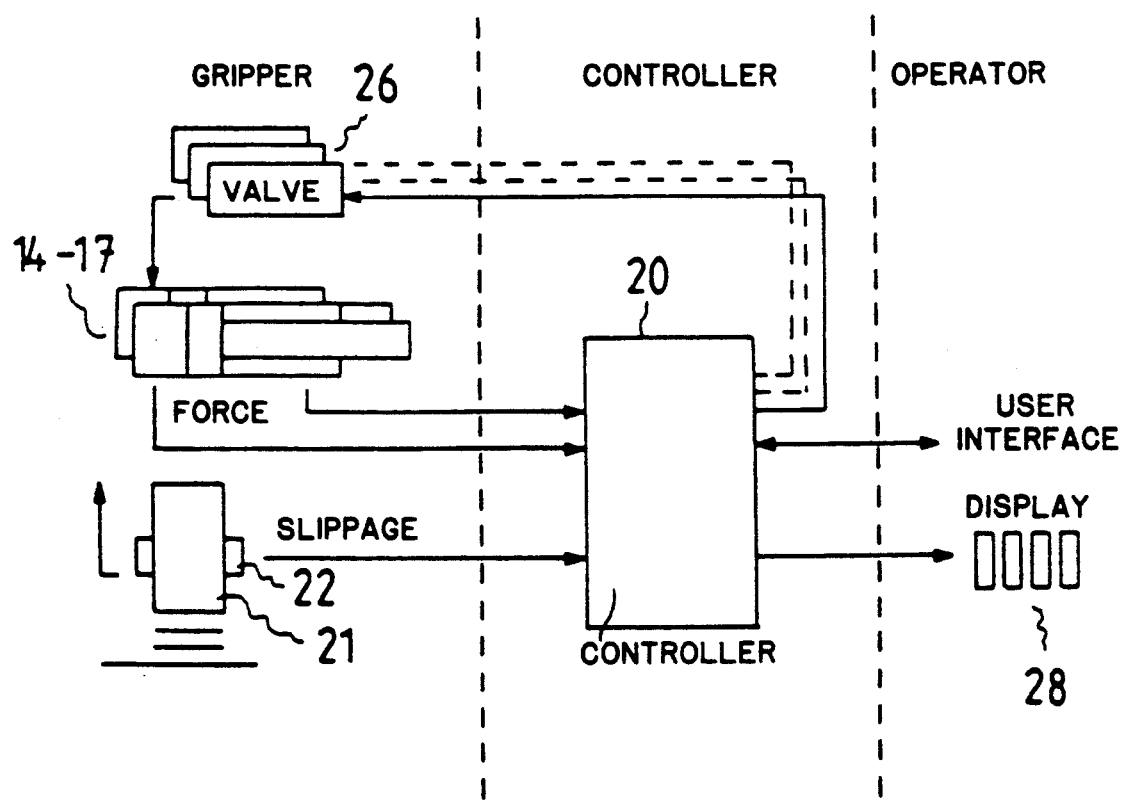

FIG. 3 presents a block diagram of the regulating system of the invention.

FIG. 1 shows a gripper designed for the lifting and moving of paper rolls 2 or other loads. The gripper, mounted e.g. on a forklift truck, is provided with turnable jaws 6 and 7 attached to a frame 3, the fulcra of the jaws being located at points 4 and 5. One of the jaws is a divided one and the other a continuous jaw. The ends of the jaws are provided with plate-like, hinged jaw flaps 8-10 which grip the load. The frame accommodates a hydraulic system 11 comprising a rack-and-pinion gear and hydraulic cylinders for turning the jaws and a hydraulic valve 12 with an inbuilt overpressure protection.

According to the invention, the compressive force is adjusted on the basis of the slippage between the paper roll 2 and the jaw flaps 8-10 at the ends of the jaws 6 and 7.

The operating cycle begins when the forklift truck brings the gripper onto the paper roll, placed in an upright position, so that the gripper jaws 6 and 7 come on opposite sides of the roll. Compression is started when the operator opens the manual valve 13 (FIG. 2). The oil now flows directly into the hydraulic cylinders (compressing cylinders) 14-17, causing the jaws 6 and 7 to turn until they touch the roll. When the pressure measured by pressure sensors 18 and 19 rises to a predetermined precompression value, the regulator (in the controller, FIG. 3) starts the measurement of the slippage. The slippage is measured by means of a pulse transducer 21 mounted on a jaw flap 10. The transducer is provided with a rubber roller 22 rotating on an axle and held in contact with the paper roll by a spring. As the roll slides relative to the jaw flap 10, the roller 22 rotates and the pulse transducer measures the relative movement in terms of a pulse count.

Simultaneously with the slippage measurement, a slow lifting action (preliminary lifting) is started. The regulator opens the magnetic valves 23 and 24, permitting some oil to flow into the lifting cylinder 25 of the forklift truck. The slow lifting motion enables the slippage to be detected. The forklift truck lifts the gripper slowly and the roll remains at first unmoved. The valves 23 and 24 may also be connected in a different way from FIG. 2.

Based on the slippage, the regulator controls a pressure limiter type proportional valve 26 which limits the pressure admitted into the cylinders 14-17 in accordance with its control voltage. The pressure can never rise beyond the value to which the mechanical, spring-loaded pressure limiting valve 27 has been adjusted. The pressure is increased until the gripper holds the roll fast and no slipping occurs. When this is the case, the regulator stops increasing the pressure and an indicator light 28 or equivalent signals the operator that the compression has been completed. The operator may then close the manual valve 13. After this, the operator may lift or turn the roll 2 and drive the forklift truck 1 as required.

It is also possible to optimize the compressive force during the whole load handling operation, comprising the main lifting operation, the transfer and the lowering of the load. In this case, the slippage is measured continuously and, if the roll 2 starts slipping, the pressure between the jaws 6 and 7 is increased automatically until no slipping occurs.

It is obvious to a person skilled in the art that the invention is not restricted to the example described above, but that it may instead be varied within the scope of the following claims. The regulation of the compressive force can be implemented as provided by the invention regardless of the structure of the jaws, e.g. in the case of a gripper provided with two or more divided jaws and having a linear jaw motion. Moreover, the system regulating the compressive force may comprise two more transducers e.g. if the system has been designed for simultaneous handling of several paper rolls.

We claim:

1. Gripper for a fork-lift truck for handling paper rolls, the gripper comprising a lifting device with which at least one roll can be lifted by at least one lifting cylinder, operating by means of a working fluid, and jaws closed to grasp said at least one roll by at least one compression cylinder, operating by means of a working fluid, the gripper further comprising:

at least one measuring device for measuring continuously the slippage between said at least one roll and the jaws;

at least one pressure sensing device for measuring the pressure of a working fluid flowing into said at least one compression cylinder producing a compressive force; and a control unit for controlling said at least one lifting cylinder to lift the jaws with said at least one roll, after the compressive force reaches a predetermined precompression value, and for increasing the compressive force in a continuum from the predetermined precompression value, to a value at which there is no slippage between said at least one roll and the jaws;

wherein the device measuring the slippage is a pulse counting device and is so mounted on a jaw flap at the end of a jaw that it comes into contact with said at least one roll;

wherein the compressive force is increased from the predetermined precompression value in proportion to the amount of slippage measured by the measuring device;

wherein the gripper is provided with at least one valve which admits a small flow of working fluid into the lifting cylinder to facilitate a preliminary lifting operation; and wherein the gripper is provided with a pressure limiting valve to limit the pressure of the working fluid admitted into said at least one compression cylinder once slippage between said at least one roll and the jaws ceases.

2. The gripper according to claim 1, further comprising a manual control device by which the operator may start and end the compression stage, and an indicator device for indicating the end of the compression stage.

3. The gripper according to claim 1, wherein the slippage measuring device has a roll type configuration and is capable of measuring the slippage of said at least one roll.

4. The gripper according to claim 3, wherein the slippage measuring device is a pulse transducer provided with a roller, wherein said roller rotates on an axle and contacts said at least one roll by a spring, wherein said pulse transducer measures relative movement between said roller and said roll in terms of a pulse count.

5. The gripper according to claim 1, wherein the slippage measuring device is placed in the middle of the flap of the jaws.

6. The gripper according to claim 1, wherein said working fluid further comprises a hydraulic fluid, and wherein said at least one compression cylinder further comprises at least one hydraulic cylinder.

7. The gripper according to claim 1, wherein said working fluid further comprises pneumatic air and wherein said at least one compression cylinder further comprise at least one pneumatic cylinder.

* * * * *

UNITED STATES PATENT AND TRADEMARK OFFICE
CERTIFICATE OF CORRECTION

PATENT NO. : 5,292,219
DATED : March 8, 1994
INVENTOR(S) : Peter Merin, et al.

It is certified that error appears in the above-indentified patent and that said Letters Patent is hereby corrected as shown below:

Title page, item (54) and column 1, title should read --"Apparatus for the Handling of Loads"--.

Col. 1, line 1, before "Apparatus" delete "Procedure and".

Col. 1, line 7, after "to" delete "a procedure as defined in the introductory part of claim 1 and".

Col. 1, line 9, after "claim" delete "5" and insert therefore --1--.

Col. 1, line 25, before "presented" delete 'clauses of claims 1 and 5," and insert therefore --clause of claim 1,--.

Signed and Sealed this

Thirtieth Day of August, 1994

BRUCE LEHMAN

Attest:

Attesting Officer

Commissioner of Patents and Trademarks